United States Patent
Fishwick et al.

(10) Patent No.: US 9,892,547 B2
(45) Date of Patent: *Feb. 13, 2018

(54) TESSELLATING PATCHES OF SURFACE DATA IN TILE BASED COMPUTER GRAPHICS RENDERING

(71) Applicant: Imagination Technologies Limited, Kings Langley (GB)

(72) Inventors: Steven J. Fishwick, Kings Langley (GB); John W. Howson, Kings Langley (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/372,088

(22) Filed: Dec. 7, 2016

(65) Prior Publication Data

US 2017/0091986 A1    Mar. 30, 2017

Related U.S. Application Data

(63) Continuation of application No. 14/135,125, filed on Dec. 19, 2013, now Pat. No. 9,547,934.

(30) Foreign Application Priority Data

Dec. 20, 2012  (GB) .................................. 1223099.1

(51) Int. Cl.
*G06T 15/30* (2011.01)
*G06T 15/40* (2011.01)
(Continued)

(52) U.S. Cl.
CPC .......... *G06T 15/405* (2013.01); *G06T 15/005* (2013.01); *G06T 17/10* (2013.01); *G06T 17/20* (2013.01)

(58) Field of Classification Search
None
See application file for complete search history.

(56) References Cited

U.S. PATENT DOCUMENTS 5,357,600 A    10/1994    Shirman et al.
5,864,342 A    1/1999    Kajiya et al.
(Continued)

FOREIGN PATENT DOCUMENTS

GB    2378108 A    1/2003
WO    2009/093956 A    7/2009

OTHER PUBLICATIONS

Anjul Patney, John D. Owens, "Real-Time Reyes-Style Adaptive Surface Subdivision", Dec. 2008, ACM, ACM Transactions on Graphics, vol. 27, No. 5, Article 143.
(Continued)

*Primary Examiner* — Andrew G Yang
(74) *Attorney, Agent, or Firm* — Vorys, Sater, Seymour and Pease LLP; Vincent M DeLuca (57) ABSTRACT

A method and system for culling a patch of surface data from one or more tiles in a tile based computer graphics system. A rendering space is divided into a plurality of tiles and a patch of surface data read. Then, at least a portion of the patch is analysed to determine data representing a bounding depth value evaluated over at least one tile. This may comprise tessellating the patch of surface data to derive a plurality of tessellated primitives and analysing at least some of the tessellated primitives. For each tile within which the patch is located, the data representing the bounding depth value is then used to determine whether the patch is hidden in the tile, and at least a portion of the patch is rendered, if the patch is determined not to be hidden in at least one tile.

18 Claims, 6 Drawing Sheets

(51) Int. Cl.
*G06T 17/20* (2006.01)
*G06T 17/10* (2006.01)
*G06T 15/00* (2011.01)

(56) References Cited

U.S. PATENT DOCUMENTS

| | | |
|---|---|---|
| 6,246,415 B1 | 6/2001 | Grossman et al. |
| 6,480,205 B1 | 11/2002 | Greene et al. |
| 7,450,120 B1 | 11/2008 | Hakura et al. |
| 8,089,486 B2 | 1/2012 | Anderson et al. |
| 2003/0025695 A1 | 2/2003 | Morphet |
| 2006/0033735 A1 | 2/2006 | Seiler et al. |
| 2010/0020090 A1 | 1/2010 | Langtind et al. |
| 2010/0182314 A1 | 7/2010 | Akenine-Moller et al. |
| 2011/0267346 A1 | 11/2011 | Howson |
| 2012/0229464 A1 | 9/2012 | Fishwick |
| 2012/0299910 A1 | 11/2012 | Liang |
| 2013/0120380 A1 | 5/2013 | Kallio et al. |

OTHER PUBLICATIONS

Charles Loop et al: "Real-Time Patch-Based Sort-Middle Rendering on Massively Parallel Hardware",1 May 200, XP055051276, Retrieved from the Internet: URL:http://research.microsoft.com/en-us/um (people/cloop/msrtr-2009-83.pdf.

Chung K et al:"Shader-based tessellation to save memory bandwidth in a mobile multimedia processor", Computers and Graphics, Elsevier, GB, vol. 33, No. 5,Oct. 1, 2009 (Oct. 1, 2009), pp. 625-637, XP026738431,ISSN:0097-8493.

Robert L. Cook, Loren Carpenter, Edwin Catmull, "The Reyes Image Rendering Architecture", Jul. 31, 1987, ACM, Computer Graphics, vol. 21, No. 4, pp. 95-102.

Eisenacher, et al. "Real Time View-Dependent Rendering of Parametric Surfaces" Proceedings of the 2009 Symposium on Interactive 3D Graphics and Games, ACM Mar. 1 2009, pp. 137-143.

Kun Zhou et al: "RenderAnts", ACM SIGGRAPH Asia 2009 Papers on, SIGGRAPH Asia '09, Jan. 1, 2009 (Jan. 1, 2009), p. 1, XP055051442, New York, New York, USA DOI: 10.1145/1661412. 1618501 ISBN: 978-1-60-558858-2.

Aila et al., "Delay Streams for Graphics Hardware," ACM Transactions on Graphics, vol. 22, p. 792-800 (2003).

TESSELLATING PATCHES OF SURFACE DATA IN TILE BASED COMPUTER GRAPHICS RENDERING

BACKGROUND

Field

The present invention relates to a method and system for culling hidden tessellated primitives in a tile based computer graphics rendering system.

Related Art

Tile based rendering is a known technique for rendering 2D or 3D computer graphics images. A rendering space is sub-divided into a plurality of regions called tiles or blocks, which are typically rectangular, and each comprises a plurality of pixels. The rendering space may correspond to an image for display on a screen, but other render targets, such as texture data in memory, are also possible. Tiles can be various sizes, but a typical size is for example 16×16 pixels. An image of 1280×1024 pixels may be sub-divided into 5120 tiles (each comprising 16×16 pixels), for example.

In tile based computer graphics systems primitive data is typically read from memory and transformed into screen space. Primitives are often polygons, for example triangles, but may be lines or points. A display list is then generated, for each tile, indicating the primitives, if any, which are located either wholly or partially within the tile. The indication often comprises an identifier or index for each primitive, which references or provides a pointer to geometrical data associated with the primitive stored in a parameter memory. The display lists are stored in memory.

Each tile is then rendered independently using its display list.

For each tile, the primitives identified in the respective display list are processed and hidden surface removal may be performed. The resultant pixel data for visible fragments is then passed to a shading unit which applies textures and shading to each visible pixel within an object. After final pixel values have been determined for each pixel in the tile, the pixel data for the tile is written to memory for display on an output device.

Hidden surface removal typically uses a technique known as "z buffering". In this technique, depth values are calculated for each primitive at every pixel in the tile covered by the primitive. Then, processing each primitive in turn, the depth values of each primitive are compared to the depth values for the respective pixels stored in a "z buffer". If the depth value of a new primitive is closer to the eye or viewpoint than the presently stored depth value (for the surface of the previously processed primitives which is presently visible at that pixel), then the depth value for that pixel, and the other values for that pixel, are replaced with the values of the new primitive at the respective pixel. If the depth value of a new primitive is further from the eye or viewpoint than the presently stored depth value, the values, including the depth value, of that pixel remain unchanged.

Tessellation is a known technique for adding texture to a low detail model, generally referred to in the computer graphics industry as a patch of surface data. A patch of surface data is split into a plurality of primitives which are then optionally displaced from the surface of the patch to derive a plurality of tessellated primitives. The primitives may be displaced by application of a user programmable function and/or in dependence on a displacement height map. The tessellated primitives may then be tiled and rendered as described above. Tessellation is a useful tool which is being used more and more widely in the computer graphics industry. However, it will be appreciated that tessellating a patch of surface data can substantially increase the amount of computation which is required to render an image. Each tessellated patch of surface data may comprise thousands of tessellated primitives, which need to be processed and which may also need to be stored in memory.

The applicant has appreciated that it would be desirable to decrease the amount of data transfer, data storage, and processing required to render a tile and, in particular, a tile comprising tessellated primitives.

SUMMARY

According to one aspect, there is provided a method of culling in a tile based graphics system, comprising: subdividing a rendering space into a plurality of tiles; reading a patch of surface data; tessellating the patch of surface data to derive a plurality of tessellated primitives; analysing at least a portion of the patch comprising at least some of the tessellated primitives to determine data representing a bounding depth value evaluated over at least one tile; for each tile within which the patch is located, using the data representing the bounding depth value to determine whether the patch is hidden in the tile; and rendering at least a portion of the patch if the patch is determined not to be hidden in at least one tile.

Some embodiments have the advantage that a patch can be culled from a tile without having to process and perform a depth cull for each individual tessellated primitive. Thus, some embodiments enable the amount of processing and memory bandwidth required to render an image comprising a patch of surface data to be reduced.

Some method embodiments have an advantage that any displacement of the tessellated primitives from the surface of the patch can be taken into account when determining the data representing the bounding depth value evaluated over the at least one tile, in a simple manner.

In some embodiments the analysing step further comprises, for each of the plurality of tessellated primitives, using the bounding depth value for the tessellated primitive to determine whether the tessellated primitive is hidden in the at least one tile, wherein the at least some of the tessellated primitives comprise the tessellated primitive if it is determined not to be hidden in the at least one tile. This embodiment has the advantage that only bounding depth values of those tessellated primitives that are not hidden may be used to determine the data representing the bounding depth value for the patch. This means that the bounding depth value for the patch is likely to represent a smaller range of depth values, which increases the likelihood that the patch can be culled from a tile based on a depth test performed using this bounding depth value.

In a further embodiment, this method may further comprise culling each tessellated primitive determined to be hidden in the least one tile such that it is not indicated in a display list for the at least one tile. This enables memory space to be saved.

The bounding depth value evaluated over the at least one tile may be a bounding depth value for the entire patch. Alternatively, a bounding depth value may be determined for each respective tile the patch is located within. In this case, the analysing step may comprise, for each tile the patch is located within, analysing a corresponding portion of the patch to determine data representing a bounding depth value evaluated over that tile. Thus, in this case, if the patch is located over a plurality of tiles, the bounding depth value evaluated over the least one tile will comprise a plurality of bounding depth values (each evaluated over a respective tile).

The bounding depth value evaluated over the at least one tile may comprise a maximum bounding depth value and or a minimum bounding depth value.

The data representing the bounding depth value evaluated over the at least one tile may be used to determine whether the patch is hidden in a tile before or after the patch is indicated in the display list for the tile.

A first embodiment comprises, for each tile within which the patch is located, indicating at least a portion of the patch in a display list for the tile if the patch is determined not to be hidden in the tile. This embodiment has the advantage that, not only can the amount of processing and memory bandwidth required to render the image be reduced, but the amount of memory space required to store the display lists for the tiles can be reduced, since if the patch is determined to be non-visible or hidden the patch need not be indicated in the display list for that tile.

This embodiment may further comprise: writing the data representing the bounding depth value to a memory; and, for each tile whose display list indicates at least a portion of the patch, reading the data representing the bounding depth value from the memory and using the data representing the bounding depth value to determine whether the patch is hidden in the tile.

An alternative, second embodiment comprises: for each tile within which the patch is located, indicating at least a portion of the patch in a display list for the tile; writing the data representing the bounding depth value evaluated over the at least one tile to a memory; and wherein the step of, for each tile within which the patch is located, using the data representing the bounding depth value to determine whether the patch is hidden in the tile further comprises: reading the data representing the bounding depth value from the memory.

These embodiments require that the data representing the bounding depth value evaluated over the at least one tile is stored in memory, which takes up memory space. However, this embodiment has the significant advantage that data representing a bounding depth value for the patch can be used to perform a depth test for the patch without having to process the patch of surface data during rendering of the tile. Thus, this embodiment enables memory bandwidth, as well as processing power, to be saved similarly to the first embodiment, since for example if the patch can be culled from a tile, geometric data associated with that patch does not need to be read from a parameter memory.

This second embodiment may also comprise an additional step, before the step of, for each tile within which the patch is located, indicating at least a portion of the patch in a display list for the tile, comprising using the data representing the bounding depth value evaluated over the at least one tile to determine whether the patch is hidden in a tile and, if not, culling the patch from the tile such that it is no longer located within the tile.

A corresponding apparatus is also provided.

BRIEF DESCRIPTION OF THE FIGURES

Embodiments of the present invention will now be described by way of example only with reference to the accompanying drawings in which.

DETAILED DESCRIPTION

The applicant's patent application publication No. GB 2480012 (corresponding to U.S. application Ser. No. 13/066,957, filed Apr. 28, 2011, and which is incorporated by reference herein) discloses a method and system for tessellating a patch of surface data in a tile based computer graphics rendering system.

In this system, a patch of surface data is tessellated to derive a plurality of tessellated primitives as described above. Then, for each tile, each tessellated primitive located at least partially within the tile is indicated in the display list for the tile, for example by storing one or more indices for each tessellated primitive. However, instead of storing geometrical data associated with each individual tessellated primitive in parameter memory, geometrical data is stored for the patch of surface data, from which the tessellated primitives can subsequently be re-derived. It will be appreciated that this method substantially reduces the amount of data which needs to be stored in parameter memory, although at the cost of increasing the amount of computation required to render each tile. To render each tile, the patch of surface data is re-tessellated to re-derive the tessellated primitives identified in the respective display list. Each tessellated primitive is then processed as described above.

Methods and systems for culling primitives which are entirely hidden in a tile (that is, primitives which are not visible at any pixels in the tile) without requiring all of the processing required by typical hidden surface removal techniques are known, for example as disclosed in the applicant's GB patent no. 2,378,108 (which corresponds to U.S. patent application Ser. No. 10/202,220, filed on Jul. 24, 2002 and is incorporated by reference in its entirety herein).

In this method, primitives which are entirely hidden in a tile are culled before hidden surface removal is performed by comparing the depth of each primitive to the range of depths stored in the "z buffer" for the tile. For example, the minimum depth of a primitive (the depth closest to the viewpoint) may be compared to the greatest or maximum depth indicated by the depth values stored in the "z buffer" (i.e. the depth furthest from the viewpoint). If the minimum depth of the primitive is further from the viewpoint than the maximum depth value in the "z buffer", then it is known that that primitive must be entirely hidden in the tile without having to calculate and compare depth values for that primitive at every pixel in the tile. Thus, this method reduces the amount of processing required to render each tile.

The term "object" is used in the following to describe a graphical element such as a primitive or a model generally referred to within the computer graphics industry as a "patch" of surface data.

The examples below are illustrated in the context of a graphics system in which a depth compare mode of "less than" is being used. In other words, objects are visible at points where their depth is less than that of other objects at that point. However, it will be understood that graphics systems can use a variety of different depth compare modes, and interchange between them. Other example depth compare modes include "greater than", "greater than or equal", "less than or equal", "equal", "not equal", "always", and "never". The example of a "less than" depth compare is merely used for clarity, and the techniques below can be readily applied for any suitable depth compare mode.

Figure 1:
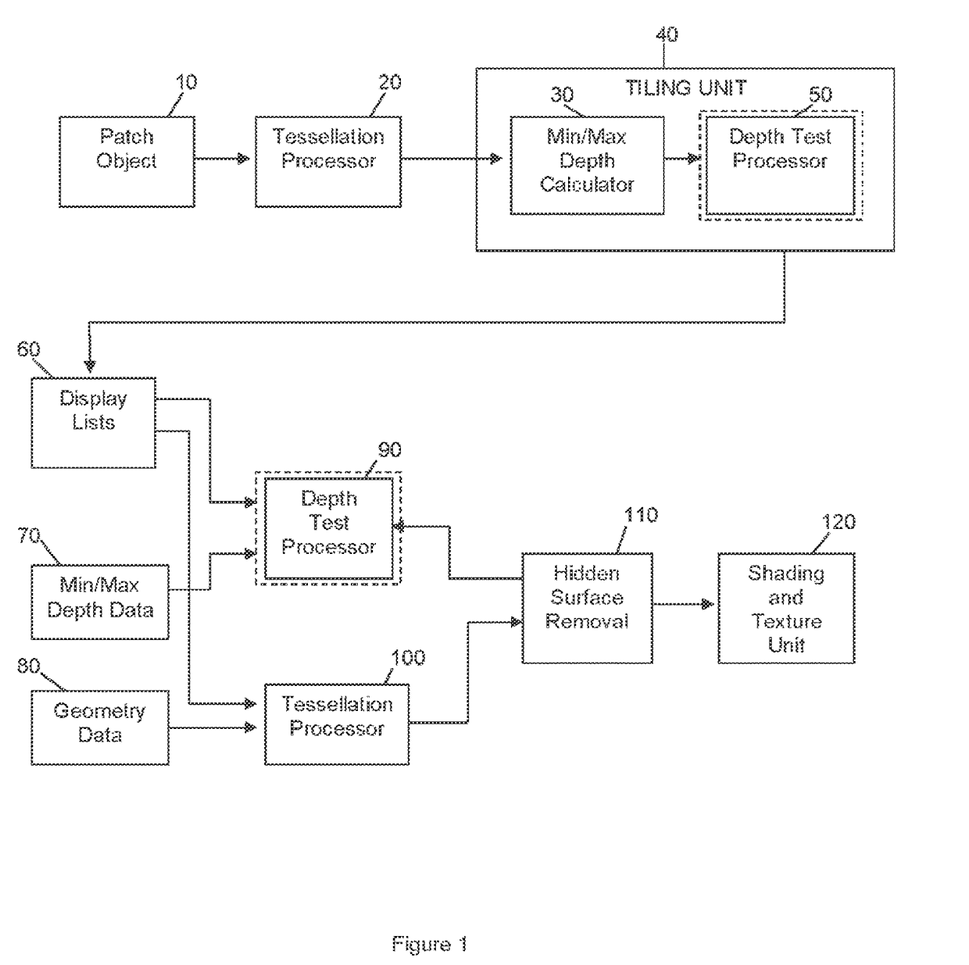
FIG. 1 is a schematic block diagram showing apparatus embodying the invention.

FIG. 1 is a schematic diagram showing apparatus for generating and shading a computer graphics image using tessellation in one embodiment of the present invention. The parts that comprise this apparatus may be implemented as circuits in a processor such as a graphics processor unit (GPU), or may be implemented as a program running on a programmable device such as a GPU or CPU.

Patch of surface data 10 is passed to a tessellation processor 20 which divides the patch into a plurality of primitives and optionally displaces the primitives from the surface of the patch by applying a user programmable function or in dependence on a displacement or texture map to derive a plurality of tessellated primitives.

A patch is typically a parametric function defined by a set of control points which describe the shape of a curve with respect to parameter 't' (for a curved line) or domain coordinates 'u,v' (for a curved surface). One example of a patch used in computer graphics is a Bezier patch, but others exist as will be appreciated by a person skilled in the art.

As will be known to those skilled in the art, tessellation of patches of surface data in a graphics pipeline can be supported by a number of application programming interfaces (APIs), for example, Microsoft® Direct 3D® 11 API. Microsoft® Direct 3D® 11 API supports displacement mapping, whereby the tessellated primitives may be at a displaced location from the surface of the patch.

Once the tessellated primitives are derived they are passed to a minimum and or maximum depth calculator 30 which analyses the patch to determine bounding depth values.

Optionally, the primitives may first be passed to a clipping and culling unit (not shown) which removes, for example, any back-facing, off-screen or non-visible primitives, and then the remaining primitives may be passed to a projection unit (also not shown) which transforms the primitives into screen space.

In this embodiment, the minimum and or maximum depth calculator 30 determines the minimum and or maximum depth of the entire tessellated patch of surface data. That is, the depth of the tessellated patch of surface data furthest from the viewpoint and or the depth of the tessellated patch of surface data closest to the viewpoint. This may be done by determining and comparing the depths of each of the tessellated primitives making up the tessellated patch of surface data, as they are derived. There is therefore no need to store the depths of each of the tessellated primitives at any one time. Determining the depth of each of the tessellated primitives may be done using well known methods, examples of which are given below.

Determining the minimum and or maximum depths of a patch from the tessellated primitive data ensures that the minimum and or maximum depths incorporate the effect of any displacement mapping that may have been applied to the patch. Other methods of determining minimum and or maximum depths for a patch are possible, as will be appreciated by those skilled in the art. For example, a bounding volume which encloses the object may be determined, from which minimum and maximum bounding depth values can be determined using known techniques. Bounding volumes can be many shapes, for example spheres, cylinders or rectangular boxes. Many of the surface patches used in computer graphics, such as Bezier and B-spline types, have the property that they lie completely within the convex hull of their control points. A bounding volume may therefore be determined by analysis of the patches prior to tessellation. It will be appreciated that the accuracy of the bounding depth values determined for the object will depend on how closely the bounding volume surrounds the enclosed object, and that care must be taken to ensure that the effects of displacement mapping are taken into consideration.

In an alternative embodiment, minimum and or maximum depth data may be determined by analysis of the respective parts of the patch of surface data located within each tile. Patches of surface data may be very large and often extend across more than one tile, so minimum and or maximum depth data determined for the respective parts of a patch located within a single tile may represent a significantly smaller range of depth values than minimum and or maximum depth data determined for the whole patch. A smaller range of depth values increases the chance that the patch may be culled from the tile before rendering. The skilled person will appreciate that a variety of methods exist for determining minimum and maximum depth data for the parts of a patch located within a tile, and these include methods that use bounding volumes and the convex hull properties of the patch.

The presence in the system of a tiling unit 40, which is able to determine whether a primitive is located wholly or partially within a tile, makes a method of determining minimum and or maximum depth data from the tiled tessellated primitives particularly appropriate. It will be appreciated that, in this case, tiling unit 40 must determines which tessellated primitives, and therefore which part of the tessellated patch of surface data, is located within each tile. The depths of each of the tessellated primitives making up the tessellated patch of surface data within the tile may be determined and compared to derive minimum and or maximum depth data for the respective parts of the tessellated patch of surface data located within each tile.

Tiling unit 40 divides the rendering space into a plurality of tiles, each comprising a plurality of image pixels. Tiles are typically rectangular but can be other shapes.

For each tile, tiling unit 40 then determines whether each of the tessellated primitives is located (either partially or wholly) within that tile. That is, whether at least part of the tessellated primitive is located within a viewable region of the tile. This can be done using a number of well-known techniques.

In some embodiments, tiling unit 40 may comprise a depth test processor 50. When it has been determined that an object is located within a tile, the depth test processor compares a minimum or maximum depth value for the object with a depth threshold value for the tile. The comparison test is performed according to the depth compare mode of the object, such that the comparison determines whether the object is potentially visible within the tile, or whether it is hidden. The depth test processor is typically not a per-pixel test, and so cannot determine that an object is definitely visible. It can, however, determine that an object is entirely hidden by other objects in the tile. If hidden the object can be culled and is not indicated in the display list for that tile.

For example, as described in the applicant's GB patent No. 2,378,108, the range of depths (minimum and/or maximum depth) of visible primitives in the "z buffer" for a tile may be fed from hidden surface removal unit 110 back to tiling unit 40, in a system which uses "partial rendering". As will be understood by those skilled in the art in a "partial rendering" system some objects located within a tile are indicated in the display list for that tile, and then those objects are rendered using the "z buffering" technique described above. Subsequently, further objects located within the tile are indicated in the display list for that tile, and then rendered. The range of depths in the "z buffer" may be fed back before those subsequent objects are indicated in the display list for the tile, such that they may be used as depth threshold values in a depth test.

Alternatively, tiling unit 40 may determine minimum and or maximum depth threshold values. It is clearly not desirable for tiling unit 40 to duplicate all of the depth work that will be carried out during hidden surface removal. However, the tiling unit 40 may for example determine conservative minimum and or maximum depth threshold values for objects added to the display list for a tile to be used in a coarse depth test.

For example, in a "less than" depth compare mode a maximum depth threshold for a tile may be updated each time an object covers the entire tile, if that object has a maximum depth closer to the viewpoint than the presently stored maximum depth threshold for visible primitives in the tile. In this case, the maximum depth threshold for the tile may be updated to the maximum depth value of that object. This is because, since the object covers the entire tile, it is known that the maximum depth threshold of visible primitives in the tile must be, at most, the maximum depth value of that object. So, if the maximum depth value of the object is closer to the viewpoint than the presently stored maximum depth threshold for the tile, then the maximum depth value for the tile can be updated. A minimum depth threshold for a tile may also be determined from the objects located in the tile.

Figure 2:
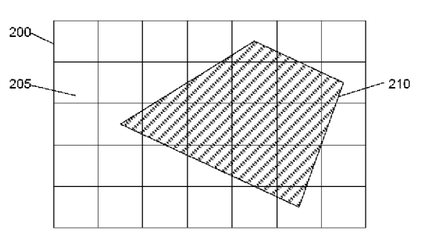
FIGS. 2, 2*a* and 2*b* illustrates determination of whether a tessellated patch of surface data may be culled from a tile.
Figure 2A:
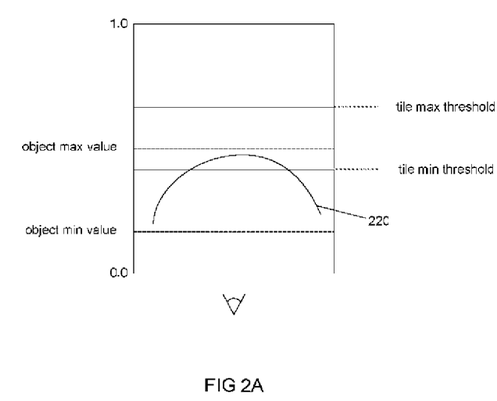
Figure 2B:
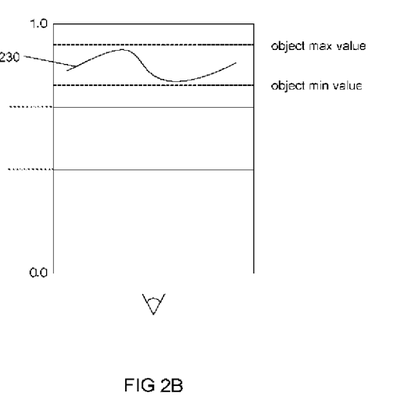

FIG. 2 shows an example screen-port image 200 comprising a plurality of tiles 205 and a tessellated patch of surface data 210. FIGS. 2a and 2b are diagrams showing minimum and maximum depth values of visible objects in an example one of the tiles. The furthest point from the viewpoint is assigned the depth value 1.0 and the closest point the depth value 0.0. The range of depth values of visible objects, which may be used as threshold values for depth tests, are indicated by solid lines. The minimum and maximum depth values of two tessellated example patches, 220 and 230, are indicated by the dashed lines. In these examples, it can be seen that the depth values for the patches are slightly conservative, as may be the case for certain methods of deriving the values.

In this example, an object is culled if it is determined to be hidden behind other objects in the image. The key depth therefore is the minimum depth value for the object. As in the example of FIG. 2a, if the minimum depth value of the object (the depth closest to the viewpoint) is closer to the viewpoint than the maximum depth threshold for the tile (i.e. the depth furthest from the viewpoint) then at least some of the object may be visible in that tile. The object is therefore not culled from the tile. In the example of FIG. 2b, however, it is seen that the minimum depth value of the object (the depth closest to the viewpoint) is further from the viewpoint than the maximum depth threshold for the tile. It is therefore known that this tessellated patch of surface data must be hidden in the tile. This object can therefore be culled from this tile.

In one embodiment the depth test is performed using a minimum or maximum depth value determined for a patch of surface data. The depth test determines whether the whole patch is hidden in the tile. In another embodiment, the depth test is performed using a minimum or maximum depth value determined for a primitive from the tessellated patch of surface data. In this case the depth test determines whether the primitive is hidden in the tile. Other primitives from the same tessellated patch of surface data may be tested independently to determine whether they are hidden in the tile.

Other methods for using the minimum and or maximum depth of the tessellated patch of surface data to determine whether the tessellated patch of surface data is hidden in a tile may occur to those skilled in the art.

If it is determined that an object cannot be culled from a tile, or if no depth test is carried out at this stage, the object is indicated in the display list for that tile. This may involve storing one or more indices for each tessellated primitive in the display list for the tile, which provide a pointer to geometrical data associated with the tessellated primitives stored in parameter memory 80. In this example, as described in the system disclosed in GB patent application publication No. 2480012, rather than storing geometric data for each of the tessellated primitives in parameter memory 80, data for the patch of surface data is stored from which the tessellated primitives can subsequently be re-derived during rendering. For example, where the patch is a Bezier patch, the data may include the control points for the patch together within the tessellation factors applied.

If it is determined that the whole tessellated patch of surface data can be culled from a tile, then no tessellated primitives are indicated in the display list for that tile. It should be noted, however, that the geometric data for the patch of surface data may still be stored in parameter memory 80, if the tessellated patch of surface data is potentially visible in other tiles.

After the display lists for each tile have been derived, the display lists are stored in memory 60. Preferably, even if a depth test has already taken place, the minimum and or maximum depth data for the tessellated patch of surface data is stored in memory 70.

To render each tile, the display list for the tile is read. For tiles whose display list references the patch of surface data, before any further processing takes place, the minimum and or maximum depth data for that patch of surface data is read from memory 70 by depth test processor 90. The depth test processor 90 may then perform a first or further depth test, for example using the method described above. Other methods are possible and will occur to those skilled in the art. It will be appreciated that performing a depth test at this stage may be more accurate than performing a depth test prior to tiling, and therefore may be more likely to result in the patch of surface data being culled from a tile. This is because minimum and or maximum depth threshold values for the tile, with which the minimum and or maximum depth values of the tessellated patch may be compared, may be determined directly from the z buffer of the hidden surface removal unit 110. Minimum and or maximum depth thresholds determined in this way may be more accurate than those derived in the tiling unit 40 because they are not affected by factors such as conservative bounding boxes, or the derivation of threshold data only from objects that cover a whole tile. Thus, even if a depth test were performed prior to tiling, if the patch has not been culled from all the tiles, it may be advantageous to store the minimum/maximum depth values for the patch and perform an additional depth test after tiling, before rendering each tile, even though this has the disadvantage of requiring additional memory space to store the min/max data for the patch.

If it is determined that the patch of surface data can be culled from a tile, then, for that tile, advantageously there is no need to process any tessellated primitives associated with that patch of surface data. There is, therefore, no need to re-tessellate the patch of surface data to re-derive those tessellated primitives indicated in the display list for that tile.

If it is determined that the patch of surface data may be visible in the tile, then tessellation processor 100 reads the geometrical data associated with the patch of surface data and re-tessellates the patch of surface data to re-derive each of the tessellated primitives identified in the display list for that tile.

Each of these tessellated primitives is then processed to render the image using well known techniques, as described above.

Each of the tessellated primitives may be passed to hidden surface removal unit 110, which removes any surfaces which are not visible in the tile, and the resulting pixel data may be passed to a texture and shading unit 120 which applies pixel or texture shading before the final pixel values for display are written to memory.

Figure 3:
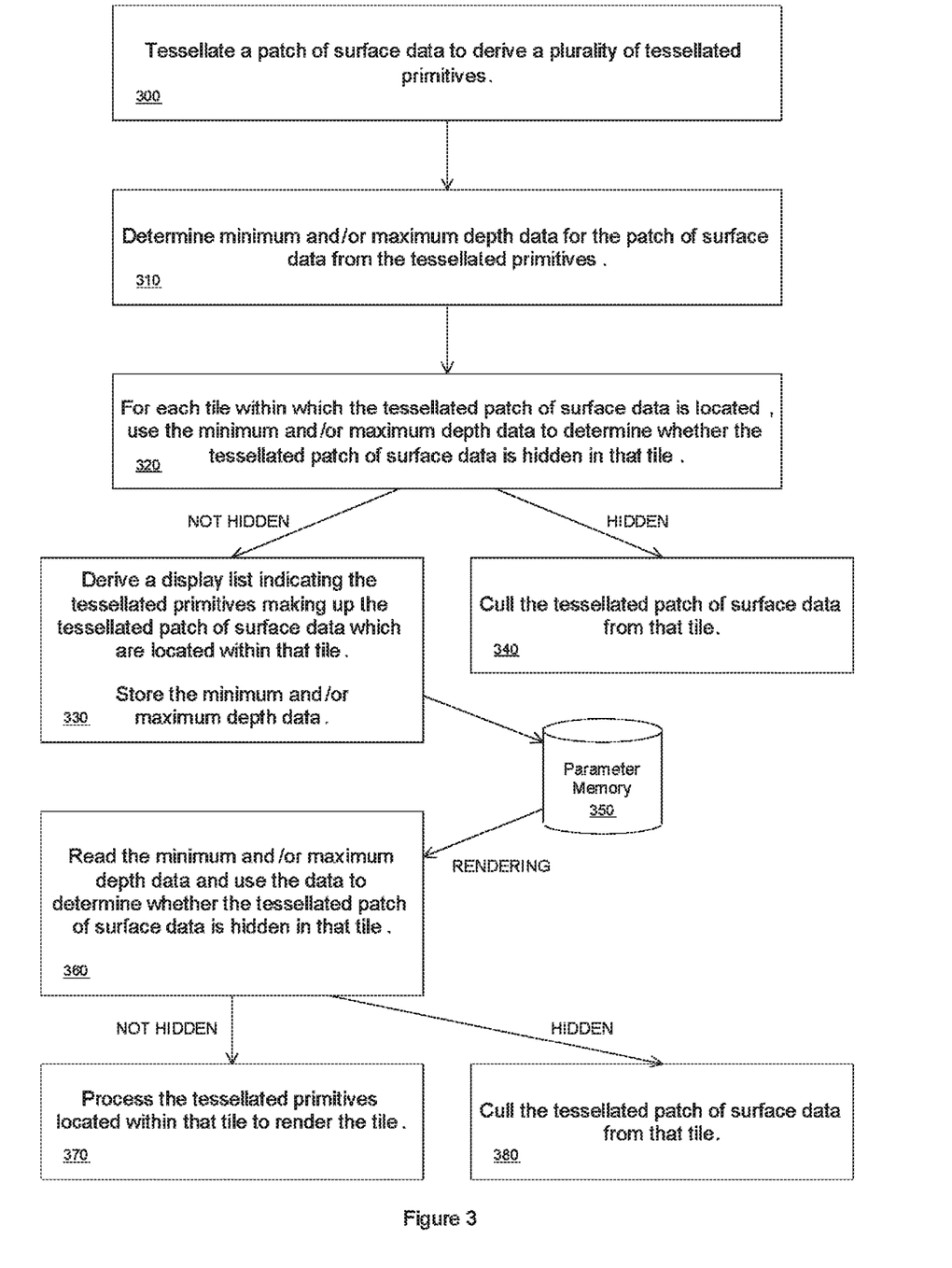
FIG. 3 is a flow chart showing the method steps in one embodiment of the invention.

FIG. 3 is a flow diagram showing one embodiment of the present invention. At step 300 a patch of surface data is tessellated to derive a plurality of tessellated primitives, which may be displaced from the surface of the patch of surface data. At step 310 minimum and or maximum depth data is then determined for the tessellated patch of surface data from the tessellated primitives. At step 320, for each tile the tessellated patch of surface data is located within, the minimum and or maximum depth data for the tessellated patch of surface data may be used to determine whether the tessellated patch of surface data is hidden in the tile If it is determined that the tessellated patch of surface data is hidden in the tile, at step 340 the tessellated patch of surface data is culled from that tile. If it is determined that the tessellated patch of surface data is not hidden in the tile, then at step 330 a display list is derived for that tile indicating those tessellated primitives which are located within the tile. In addition, the minimum and or maximum depth data may be stored for the tessellated patch of surface data. Display lists and minimum and or maximum depth data are stored in a memory 350.

To render each tile, at step 360 for each tile the tessellated patch of surface data is located within, the minimum and or maximum depth data for the patch of surface data is read and used to determine whether the tessellated patch of surface data is hidden in that tile. If it is determined that the tessellated patch of surface data is hidden in the tile, then at step 380 that tessellated patch of surface data is culled from the tile and no further processing takes place. If it is determined that the tessellated patch of surface data is not hidden, then at step 390 each of the tessellated primitives located within that tile is processed to render the tile. In the embodiment described above this includes re-tessellating the patch of surface data stored in memory to re-derive at least those tessellated primitives indicated in the display list for the tile, and then processing each of those tessellated primitives using well known techniques.

Figure 4:
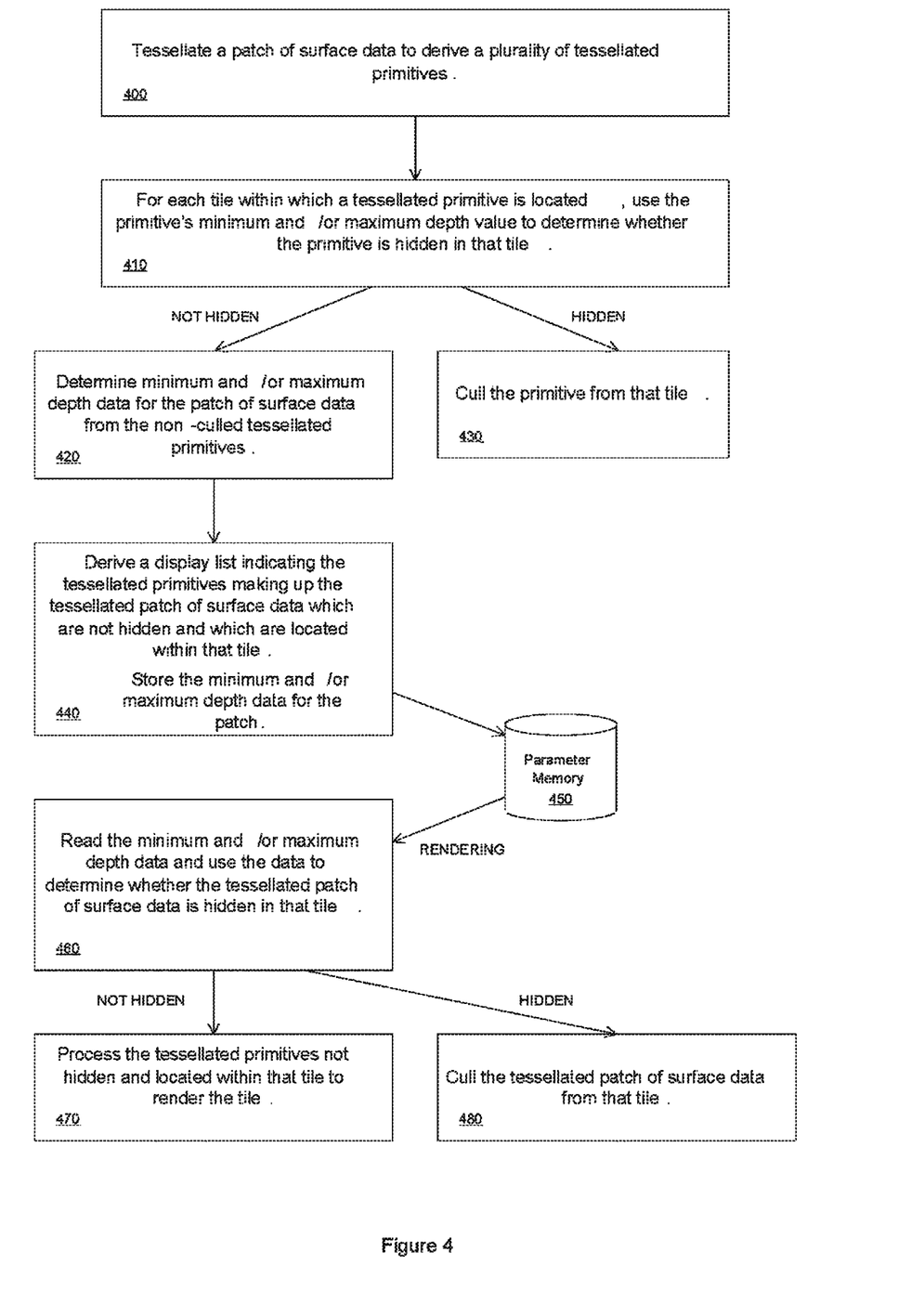
FIG. 4 is a flow chart showing the method steps in another embodiment of the invention.

FIG. 4 is a flow diagram showing another embodiment of the present invention. At step 400, a patch of surface data is tessellated to derive a plurality of tessellated primitives, which may be displaced from the surface of the patch of surface data. At step 410, for each tile that a tessellated primitive is located within, minimum and or maximum depth values for the primitive may be used to determine whether the primitive is hidden in the tile.

If it is determined that the tessellated primitive is hidden in the tile, at step 430 the tessellated primitive is culled from that tile. If it is determined that the tessellated primitive is not hidden in the tile, then at step 420 the minimum and or maximum depth data for the non-hidden primitives in the surface patch may be determined. At step 440 a display list is derived for the tile indicating those tessellated primitives which are not hidden and which are located within the tile. In addition, the minimum and maximum depth data may be stored for the tessellated patch of surface data. Display lists and minimum and or maximum depth data are stored in memory 450.

To render each tile, at step 460, for each tile the tessellated patch of surface data is located within, the minimum and or maximum depth data for the patch of surface data is read and used to determine whether the tessellated patch of surface data is hidden in that tile. If it is determined that the tessellated patch of surface data is hidden in the tile, then at step 480 that tessellated patch of surface data is culled from the tile and no further processing takes place. If it is determined that the tessellated patch of surface data is not hidden, then at step 490 each of the tessellated primitives located within that tile is processed to render the tile. In the embodiment described above this includes re-tessellating the patch of surface data stored in memory to re-derive at least those tessellated primitives indicated in the display list for the tile, and then processing each of those tessellated primitives using well known techniques.

Figure 5:
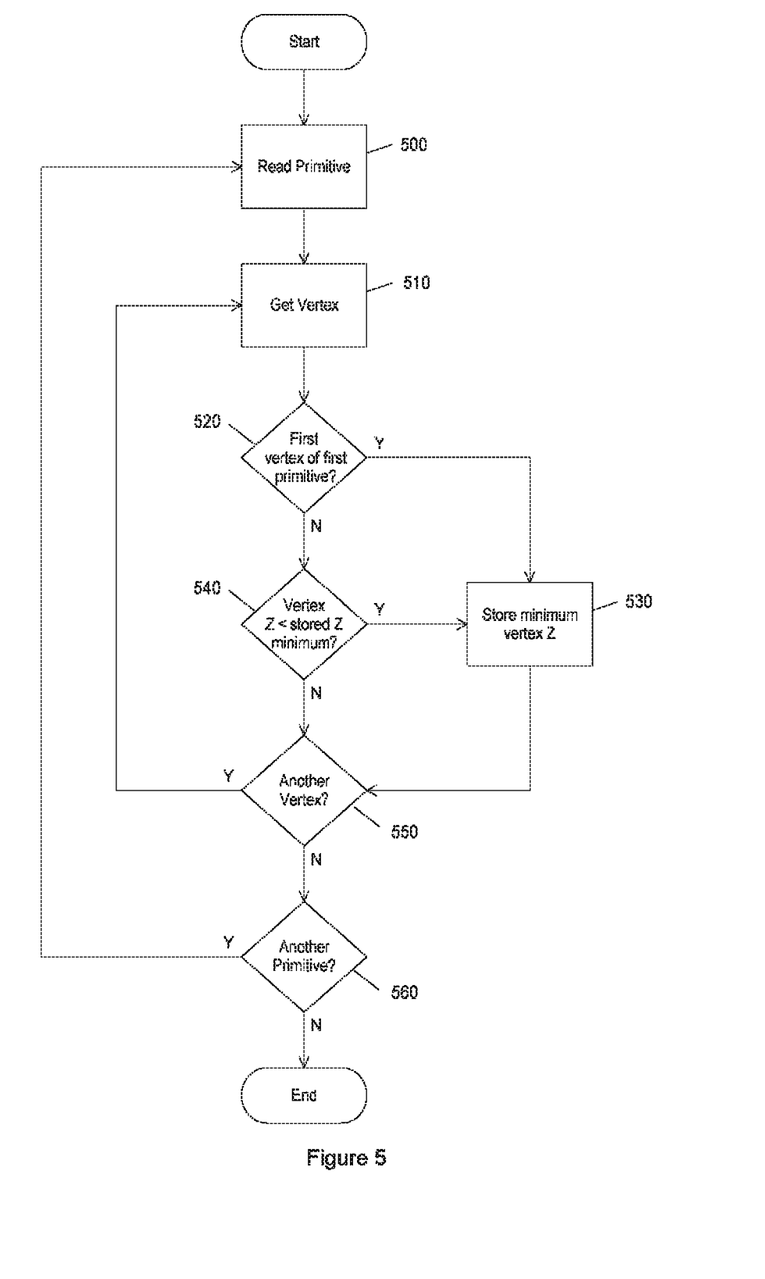
FIG. 5 is a flow chart showing an example method for determining a bounding depth range for a series of primitives such as triangles.

FIG. 5 is a flow diagram showing one method that may be used by a minimum and or maximum depth calculator, 30, for determining a bounding depth value for a set of one or more primitives, such as those that might be produced by tessellation of a patch of surface data. In this example the determination of a minimum depth value is shown.

At 500 a primitive is read, and at 510 a vertex is read from the primitive. Typically a vertex comprises coordinates X, Y, and Z, where the Z coordinate is the depth value. At 520, if the vertex is the first vertex from the first primitive in the set of primitives, the Z coordinate of the vertex is stored at 530. This provides an initial value for further comparisons. For all subsequent vertices, at 540, the Z coordinate of the vertex is compared with a Z value previously stored at 530 to determine whether it is smaller. If smaller, the Z coordinate of the vertex is stored at 530, replacing any previously stored value. At 550 a test is made to determine whether the vertex is the last vertex in the primitive. If not the flow returns to 510, and the next vertex from the primitive is processed in a similar way. After processing the last vertex in a primitive, at 560, a test is made to determine whether the primitive is the last primitive in the set. If not the flow returns to 500, and the next primitive is read and processed. After processing the last primitive in the set, the Z value stored at 530 is the smallest Z value of all the vertices examined.

The skilled person will appreciate that the method of FIG. 5 may be modified to determine a maximum bounding depth value for a set of primitives, or to produce both minimum and maximum bounding depth values for a set of primitives while making only one pass through the primitive data.

Figure 6:
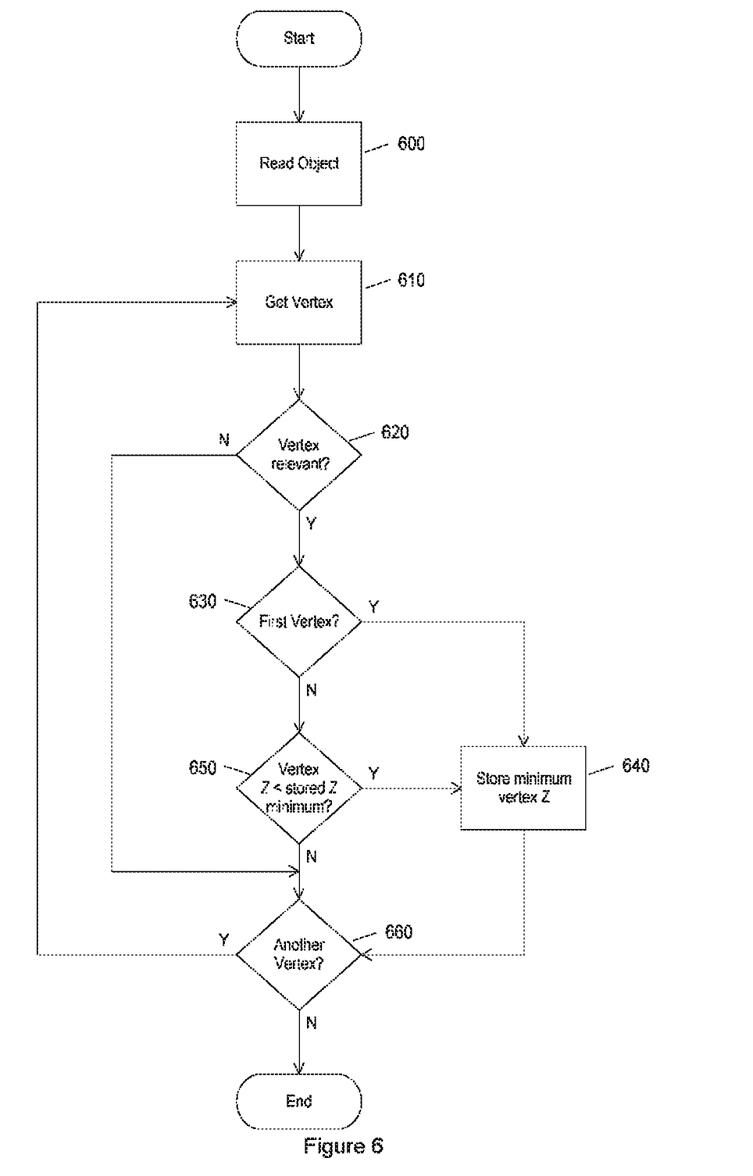
FIG. 6 is a flow chart showing an example method for determining a bounding depth range for an object such as a surface patch.

FIG. 6 is a flow diagram showing a method that may be used by a minimum and or maximum depth calculator, 30, for determining a bounding depth value for a patch of surface data. In this example a minimum depth value is determined from vertices which are the control points of the surface patch. The control points of the surface patch form a convex hull which is known to bound the patch.

At 600 an object is read, and at 610 a vertex is read from the object. At 620 the vertex is optionally tested for relevance, since it is well known that for curves such as the B-spline, the curve is bounded by the convex hull of a number of neighbouring control points and that the number of neighbouring points that define the convex hull depends on the degree of the curve. The relevance test may be particularly useful when determining a bounding volume for the part of a surface patch that is located within a particular tile, since only the control points in and around that tile define the convex hull for the surface patch inside the tile. A bounding volume determined from a smaller number of control points may be smaller, and therefore provide more effective culling, than a bounding volume computed using all control points for the surface patch. If it is determined that a vertex is not relevant the flow continues to 660.

At 630, if the vertex is the first relevant vertex from the surface patch, the Z coordinate of the vertex is stored at 640. This provides an initial value for further comparisons. For all subsequent vertices, at 650, the Z coordinate of the vertex is compared with a Z value previously stored at 640 to determine whether it is smaller. If smaller, the Z coordinate of the vertex is stored at 640, replacing any previously stored value.

At 660, a test is made to determine whether the vertex is the last vertex in the surface patch. If not, flow returns to 610. After processing the last vertex in the surface patch, the Z value stored at 640 is the smallest Z value of all the relevant vertices examined.

The skilled person will appreciate that the method of FIG. 6 may be modified to determine either a maximum, or both minimum and maximum bounding depth values, as required.

Those skilled in the art will realize that all, or a portion of the functionality, techniques or methods may be carried out by a dedicated circuit, an application-specific integrated circuit, a programmable logic array, a field-programmable gate array, or the like. For example, this may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. This may include circuitry that is fixed function and/or circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing unit configured to perform any of the methods described herein, or for generating a processing unit comprising any apparatus described herein.

What is claimed is:

1. A method in a tile based graphics system having a rendering space subdivided into a plurality of tiles, comprising:
   reading a patch of surface data;
   tessellating the patch of surface data;
   determining whether at least a portion of the patch is hidden in a tile, prior to rasterization of the patch;
   culling the patch from the tile if said portion of the patch is determined to be hidden in the tile; and
   rendering said portion if it is determined not to be hidden in the tile.

2. A method according to claim 1, wherein said determination is performed on a non per-pixel basis.

3. A method according to claim 1, further comprising, for each tile within which the patch is located:
   indicating at least a portion of the patch in a display list for the tile if said portion is determined not to be hidden in the tile; or
   not indicating the patch in the display list for the tile if said portion is determined to be hidden in the tile.

4. A method according to claim 3, further comprising performing a further determination of whether at least a portion of the patch indicated in the display list is hidden in the tile.

5. A method according to claim 4, wherein the determining step is dependent on a first depth threshold value for the tile and the further determination is dependent on a second depth threshold value.

6. A method according to claim 4, wherein the determining step is performed before the patch is tiled and the further determination is performed after the patch is tiled.

7. A method according to claim 1, wherein the patch is located in more than one tile, the method further comprising:
   determining a minimum and/or maximum depth value for the entire patch;
   for each tile within which the patch is located:
      comparing the depth value with a depth threshold for that tile to determine whether the patch is hidden in that tile; and
      culling the patch from that tile if it is determined that the patch is hidden in that tile.

8. A method according to claim 1, wherein said determining step is performed prior to tessellation of the patch.

9. A method according to claim 1, wherein the step of tessellating the patch is performed if the said portion is determined not to be hidden in the tile to derive a plurality of tessellated primitives, the method further comprising processing the plurality of tessellated primitives to render the tile.

10. A method according to claim 9, wherein the reading, tessellating, determining and processing steps are performed in a single pass on a graphics processing pipeline.

11. A method according to claim 1, further comprising:
   prior to rasterization of the patch, analysing said portion to determine data representing a bounding depth value evaluated over the tile,
   wherein the determining step comprises using the bounding depth value to determine whether said portion is hidden in the tile.

12. A method according to claim 11, wherein the bounding depth value is determined in dependence on one or more control points for the patch.

13. A method according to claim 12, wherein the bounding depth value is determined in dependence on the control points for a part of the patch that is located within the tile.

14. A method according to claim 11, wherein the bounding depth value evaluated over the tile is a bounding depth value for the entire patch.

15. A method according to claim 1, wherein said determination comprises comparing vertex data for the patch with the vertex data for another object in the tile.

16. A method according to claim 1, wherein rendering comprises rasterization of said portion determined not to be hidden in the tile.

17. A tile based graphics system having a rendering space subdivided into a plurality of tiles, the system comprising:
an interface configured to receive a patch of surface data;
a tessellation processor configured to tessellate the patch of surface data;
a depth test processor configured to
determine whether at least a portion of the patch is hidden in a tile, prior to rasterization of the patch, and
cull the patch from the tile if said portion of the patch is determined to be hidden in the tile; and
a renderer configured to render said portion if it is determined not to be hidden in the tile.

18. A non-transitory computer readable storage medium having encoded thereon computer readable program code defining an integrated circuit that, when processed in an integrated circuit manufacturing system, causes the integrated circuit manufacturing system to manufacture a tiled based graphics system having a rendering space subdivided into a plurality of tiles, the tiled based graphics system comprising:
an interface configured to receive a patch of surface data;
a tessellation processor configured to tessellate the patch of surface data;
a depth test processor configured to
determine whether at least a portion of the patch is hidden in a tile, prior to rasterization of the patch, and
cull the patch from the tile if said portion of the patch is determined to be hidden in the tile; and
a renderer configured to render said portion if it is determined not to be hidden in the tile.

* * * * *